(12) United States Patent
McDonnell et al.

(10) Patent No.: US 6,981,113 B2
(45) Date of Patent: Dec. 27, 2005

(54) STORAGE REGISTERS FOR A PROCESSOR PIPELINE

(75) Inventors: Niall D. McDonnell, Limerick (IE); John Wishneusky, Fitzwilliam, NH (US)

(73) Assignee: Intel Corporation, Santa Clara, CA (US)

(*) Notice: Subject to any disclaimer, the term of this patent is extended or adjusted under 35 U.S.C. 154(b) by 392 days.

(21) Appl. No.: 10/419,435

(22) Filed: Apr. 21, 2003

(65) Prior Publication Data

US 2004/0210747 A1 Oct. 21, 2004

(51) Int. Cl.⁷ ............................................. G06F 12/02
(52) U.S. Cl. ....................................................... 711/156
(58) Field of Search .................... 711/117, 132, 156; 712/228

(56) References Cited

U.S. PATENT DOCUMENTS

| | | | |
|---|---|---|---|
| 5,781,778 A * | 7/1998 | Meier et al. .................. 717/127 |
| 6,480,818 B1 * | 11/2002 | Alverson et al. ............. 703/26 |
| 6,507,862 B1 * | 1/2003 | Joy et al. ...................... 718/107 |
| 2002/0056034 A1 * | 5/2002 | Gearty et al. ................. 712/23 |
| 2003/0097613 A1 * | 5/2003 | Kageshima .................. 714/26 |

OTHER PUBLICATIONS

Patterson et al., "Computer Organization & Design", 1994, p 364-380.*

* cited by examiner

Primary Examiner—Kevin L. Ellis
(74) Attorney, Agent, or Firm—Buckley, Maschoff & Talwalkar LLP (57) ABSTRACT

According to some embodiments, storage registers are provided for a processor pipeline.

20 Claims, 7 Drawing Sheets

STORAGE REGISTERS FOR A PROCESSOR PIPELINE

BACKGROUND

An instruction to be executed by a processor may be associated with a number of different operations. For example, execution of an instruction might involve: fetching the instruction; decoding the instruction; performing an Arithmetic-Logic Unit (ALU) operation; and accessing data/ memory. The processor could perform all of these operations for one instruction before beginning any of the operations for the next instruction. This approach, however, may limit the rate at which the processor executes instructions.

Figure 1:
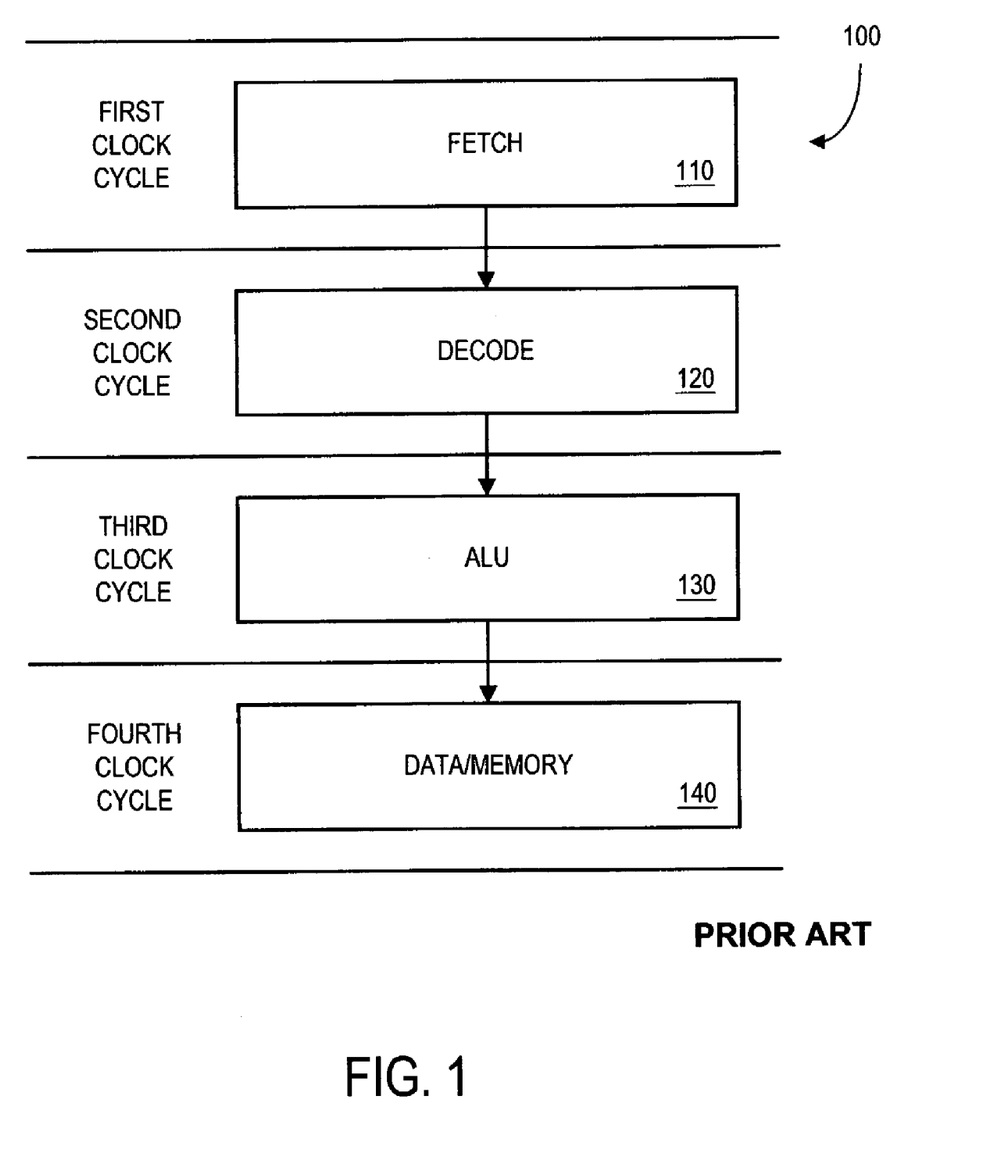
FIG. 1 is a block diagram of a known processor pipeline.

It is known that processor performance may be improved when instructions are executed via a processor "pipeline." FIG. 1 is a block diagram of a processor pipeline 100 including a fetch stage 110 that may retrieve an instruction from memory and increment a program counter. A decode stage 120 may translate that instruction and retrieve an operand, and an ALU stage 130 may perform arithmetic and logic operations on the operand. A data/memory stage 140 may read and/or write information as appropriate.

Note that each stage in the pipeline 100 may simultaneously perform operations associated with different instructions. For example, the fetch stage 110 may retrieve a first instruction from memory during a first clock cycle. When that operation is complete, the decode stage 120 may decode the first instruction and retrieve an operand during a second clock cycle. While the decode stage 120 is performing these operations for the first instruction, the fetch stage 110 may retrieve the next instruction from memory. Because the pipeline 100 performs operations associated with a number of different instructions at the same time, the rate at which the instructions are executed may be increased.

DETAILED DESCRIPTION

A processor pipeline, such as the one described with respect to FIG. 1, might be able to execute instructions associated with different context levels (e.g., different series of instructions, or "threads," that may have different priority levels). Consider, for example, a pipeline that is currently executing instructions in a first thread. In this case, a condition may occur (e.g., a hardware event) that causes the pipeline to begin executing instructions in a second thread. Subsequently (e.g., when the condition is no longer present or the second thread completes execution), the pipeline may resume executing instructions in the first thread. At this point, a determination may need to be made as to which particular instruction in the first thread should be executed next. Moreover, the state of various flags and counters associated with the pipeline may need to match the state that existed the last time an instruction in the first thread was executed. It may also be important to facilitate debugging operations associated with a pipeline that executes instructions in different context levels.

Executing Contexts Stack

Figure 2:
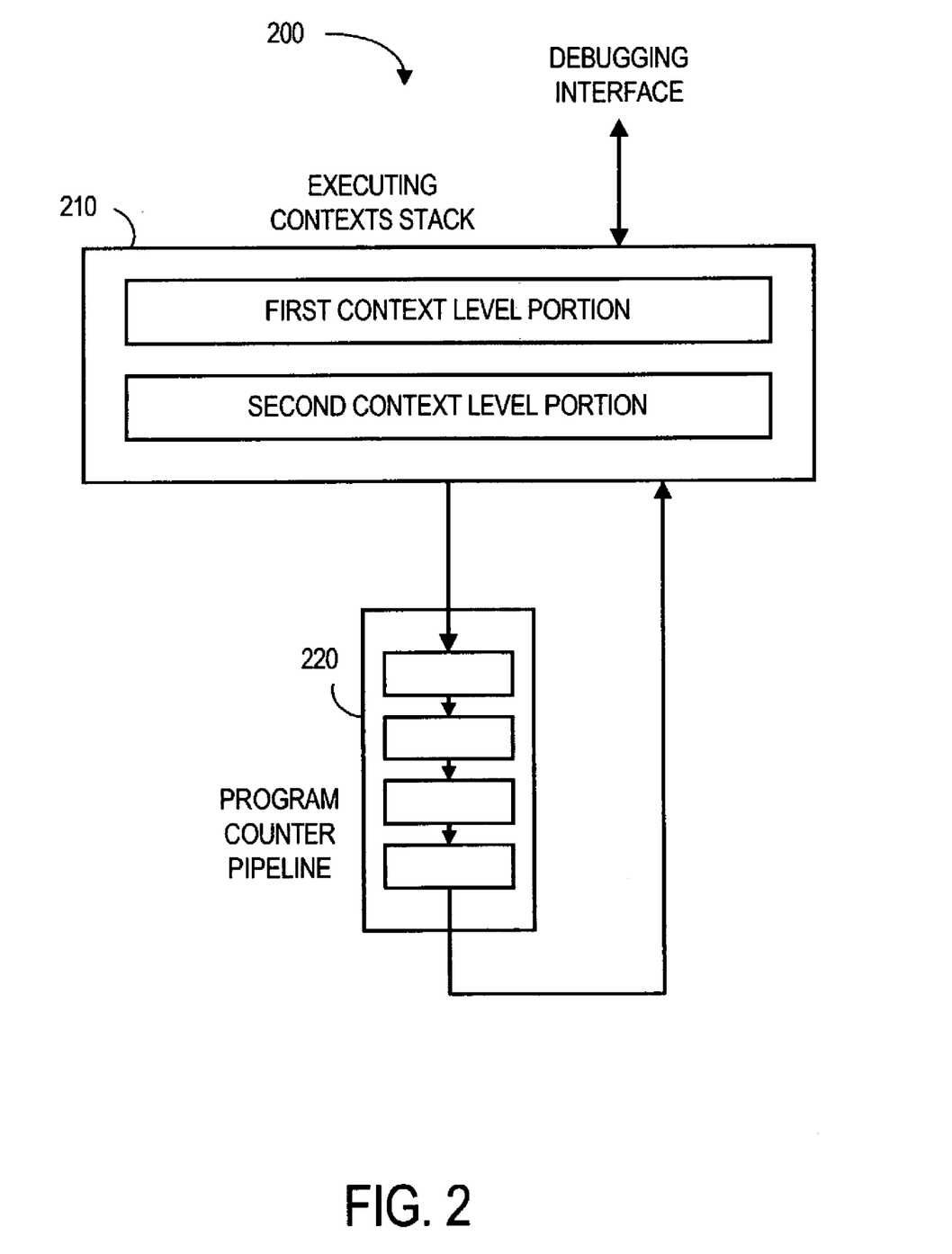
FIG. 2 illustrates an executing contexts stack and program counter pipeline according to some embodiments.

FIG. 2 illustrates an apparatus 200 that may support a processor pipeline adapted to execute instructions associated with different context levels according to some embodiments. The apparatus 200 includes an executing contexts stack 210, such as a bank of storage registers. A first portion of the executing contexts stack 210 stores information associated with a first context level. The information may include, for example, a program counter value that indicates a memory address at which an instruction is stored. The information may also include flags and other values associated with the execution state of first context level (e.g., a loop repeat count). Similarly, a second portion of the executing contexts stack 210 stores information associated with a second context level.

According to some embodiments, the information in each portion of the executing contexts stack 210 is associated with the last instruction that was completely executed in the corresponding context level. For example, the appropriate portion of the executing contexts stack 210 might be updated every time an instruction completes execution. In this way, the apparatus 200 may track context information (e.g., program counters and flag values) associated with different threads as instructions are executed. That is, the apparatus 200 may maintain the current execution state of nested thread priorities for a processor.

Some or all of the information in the portion of the executing contexts stack 210 associated with the currently executing context level may be provided to a program counter pipeline 220. The program counter pipeline 220 may comprise, for example, a series of storage registers. Each storage register in the series may advance information to the next storage register (e.g., the information might advance one storage register per clock cycle). Moreover, each storage register may correspond to a stage in the processor pipeline (e.g., the fetch, decode, ALU, and data/memory stages). Note that the program counter pipeline 220 may be part of the processor pipeline or may be a separate apparatus.

According to some embodiments, the executing contexts stack 210 facilitates the use of a debugging interface that can examine and adjust a series of instructions. For example, a user might start and stop a processor, insert a breakpoint (e.g., causing the processor to automatically stop after a particular instruction is executed), and/or execute instructions one at a time (e.g., "single-stepping" through a series of instructions).

When the processor is stopped (e.g., because a breakpoint was encountered), a user may want to inspect the internal state of the processor. For example, the user might want to examine (and possibly change) information in an internal register. Such interventions may be performed by manually inserting and executing instructions via the processor pipeline. Before the pipeline is used in this way, it may need to be cleared to remove partially completed instructions (e.g., information associated with an idle state might be written into the appropriate pipeline registers). After the internal state of the processor is examined and/or changed, the user may restart the pipeline (and the processor may resume the normal execution of instructions).

According to some embodiments, the apparatus 200 illustrated in FIG. 2 provides information that indicates which instruction should be executed after the processor pipeline is stopped, cleared, and restarted. Consider, for example, an instruction associated with a first context level. When that instruction completes execution, context information, including the address of next instruction to be executed for the first context level (e.g., a program counter value), may be written into the appropriate portion of the executing contexts stack 210 (possibly along with other context information). The next instruction may then propagate through the processor pipeline. If the processor pipeline is stopped and cleared before this instruction is completely executed, the next program counter value in the executing contexts stack 210 will still indicate that the instruction needs to be re-executed.

According to some embodiments, a debugging interface is able to read information stored in the executing contexts stack 210 (e.g., by directly reading a value from the bank of storage registers to determine a program counter value associated with a particular context level). In this way, the user might be able to determine the state of various threads that are being processed.

According to some embodiments, a debugging interface is able to write information into the executing contexts stack 210 (e.g., by directly writing values to the bank of storage registers). In this way, the user may be able to manipulate the state of various threads that are being processed. Note that the user might be able to both read information from and write information to the executing contexts stack 210. According to other embodiments, the user is able to perform only one of these two operations.

Figure 3:
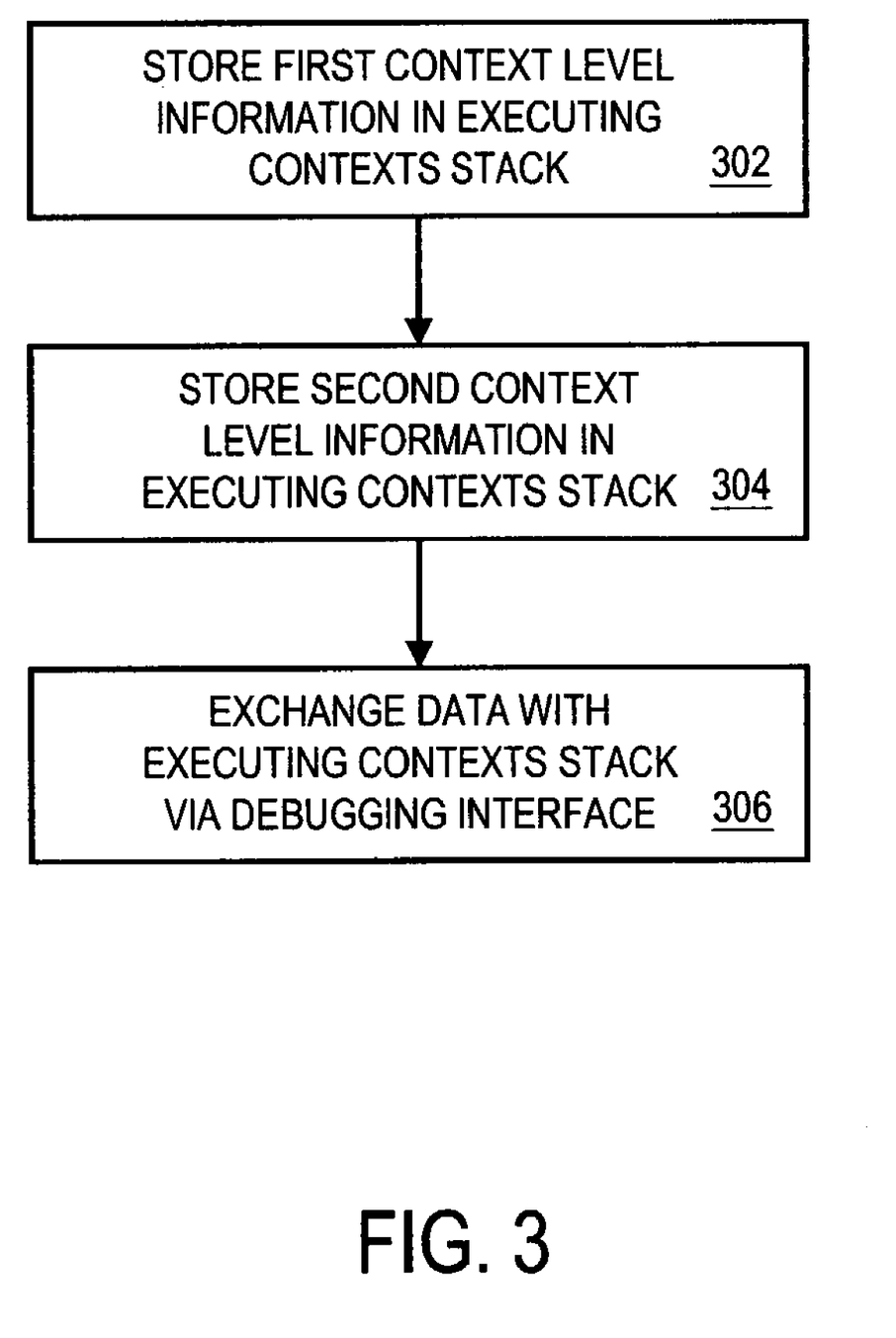
FIG. 3 is a flow chart of a method according to some embodiments.

FIG. 3 is a flow chart of a method according to some embodiments. The flow charts described herein do not necessarily imply a fixed order to the actions, and embodiments may be performed in any order that is practicable. The method of FIG. 3 may be associated with, for example, a pipeline that executes instructions with different context levels. Note that any of the methods described herein may be performed by hardware, software (including microcode), or a combination of hardware and software. For example, a storage medium may store thereon instructions that when executed by a machine result in performance according to any of the embodiments described herein.

At 302, information associated with a first context level is stored in a first portion of the executing contexts stack 210 (e.g., in a first set of storage registers). At 304, information associated with a second context level is stored in a second portion of the executing contexts stack 210 (e.g., in a second set of storage registers). The information may be generated and stored, for example, by logic circuits associated with a processor pipeline.

At 306, data is exchanged with the executing contexts stack 210 via a debugging interface. For example, a user might read information from and/or write information to the bank of storage registers. As a result, a user may be able to observe and/or control different context levels in a pipelined processor.

EXAMPLE

Figure 4:
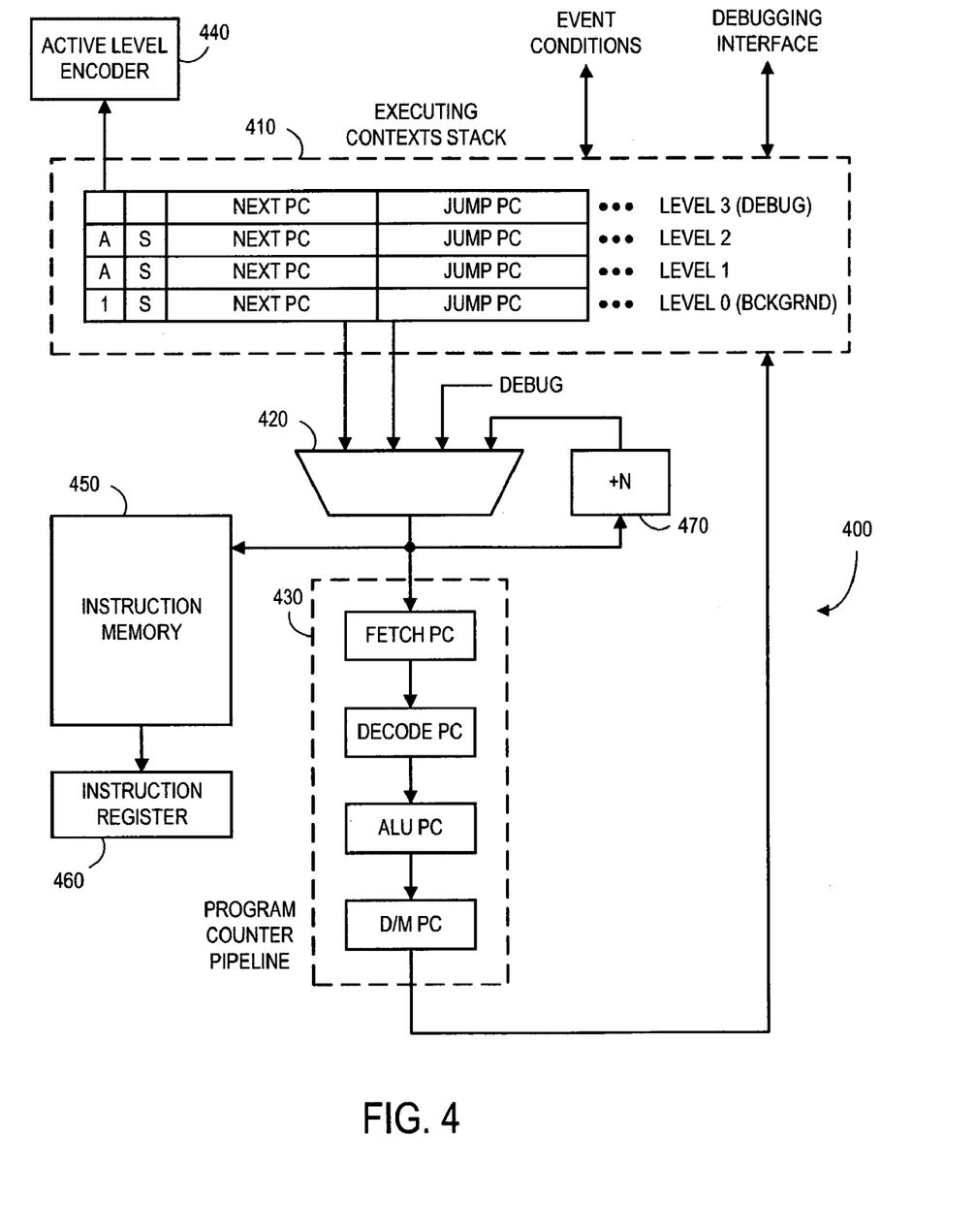
FIG. 4 is an example of an executing contexts stack and program counter pipeline according to some embodiments.

FIG. 4 is an example of an apparatus 400 associated with a processor that can execute instructions with different context levels. In particular, three levels of normal executing contexts are supported. A background context level (level 0) may always be active (e.g., instructions associated with this context level are always be executed if no other context level is active). When context level 1 becomes active (e.g., because of an event condition), it pre-empts context level 0 and instructions associated with context level 1 are be executed (provided no higher priority context level is active). Similarly, when context level 2 becomes active, it pre-empts context levels 0 and 1 (and instructions associated with context level 2 are executed).

Each context level is associated with a portion of an executing contexts stack 410 (e.g., a first set of storage registers may store information associated with context level 0). According to this embodiment, the appropriate portion of the executing contexts stack 410 is updated each time an instruction is completely executed.

The information stored in the executing contexts stack 410 might include, for example, an active indication ("A") that indicates whether or not a context level is currently active. In this case, the active indication for the background context level may always be "1" (currently active) while the active indications for context levels 1 and 2 could be either "0" (not currently active) or "1" (currently active). An active level encoder 440 may receive the active level indications to determine the highest priority context level that is currently active. A pre-emption indication (not illustrated in FIG. 4) might also be provided for each context level to indicate whether or not that context level is currently preempting another context level.

The executing contexts stack 410 may contain information that can be used to determine the next instruction that should be executed for a context level. As shown in FIG. 4, one or more program counter values may be stored for this purpose. For example, a next program counter value might indicate the next sequential address in an instruction memory 450. That is, if the last completed instruction from a context level was retrieved from address 0xABC, the next program counter value would be 0xABD.

A jump program counter value might also be stored in the executing contexts stack 410. The jump program counter may represent, for example, the address of the next instruction that should be executed if a branch condition is satisfied (e.g., as opposed to the next sequential address). Moreover, a sequential indication ("S") may indicate whether the next program counter value or the jump program counter value represents the next instruction that should be executed for that context level.

For example, if the last completed instruction was add d0, d1 (meaning that the contents of d1 was added to d0), then S would simply indicate that the next program counter represents the next instruction that should be executed for that context level. If, however, the last completed instruction was beq 0x54 (meaning that the instruction stored at 0x54 should be executed next if the zero flag is set) and the zero flag was not set, then S would indicate that the next program counter represents the next instruction that should be executed (and the value of the jump program counter would not matter). If, on the other hand, the last completed instruction was beq 0x54 and the zero flag was set, then S would indicate that the jump program counter represents the next instruction that should be executed for that context level (and the jump program counter value would be 0x54).

Other information might also be stored in the executing contexts stack 410. For example, various flag states (e.g., an ALU flag), a context number, and a loop count value could be stored for each context level.

According to some embodiments, the executing contexts stack 410 has an additional context level associated with a debugging interface (e.g., level 3). As a result, a user may be able to manually insert instructions into the processor pipeline without corrupting the state of normal (non-debugging) context levels.

Moreover, according to some embodiments the debugging interface can be used to directly read information from and/or write information to the executing contexts stack 410. For example, a user might read a loop counter value associated with a particular context level. As another example, a user may write values into the executing contexts stack 410 to achieve a particular program state (e.g., the user might artificially create a nested thread condition). Because the debugging interface has direct access to the executing contexts stack 410, a user may artificially create various execution states for the processor by writing appropriate values to the executing contexts stack 410 and starting execution.

Some or all of the information in the executing contexts stack 410 may be provided to a program counter pipeline 430 via a multiplexer 420. The program counter pipeline 430 may comprise, for example, a series of storage registers that correspond to the stages in the processor pipeline (e.g., the fetch, decode, ALU, and data/memory stages). When information reaches the end of the program counter pipeline 430 (e.g., the instruction has completely executed), the appropriate portion of the executing contexts stack 410 may be updated.

The output of the multiplexer 420 may be used to access information from the instruction memory 450. For example, the multiplexer 420 might output a program counter value that is used to retrieve an instruction from the instruction memory 450 (and the instruction may be placed an instruction register 460 so that it will be executed by the processor pipeline).

The multiplexer 420 might provide an automatically incremented program counter value to the program counter pipeline 430. For example, a logic block 470 might automatically increment the current program counter value by one. Moreover, according to some embodiments, a debugging interface can inject information into the program counter pipeline 430 via the multiplexer 420.

Pipeline Registers

Figure 5:
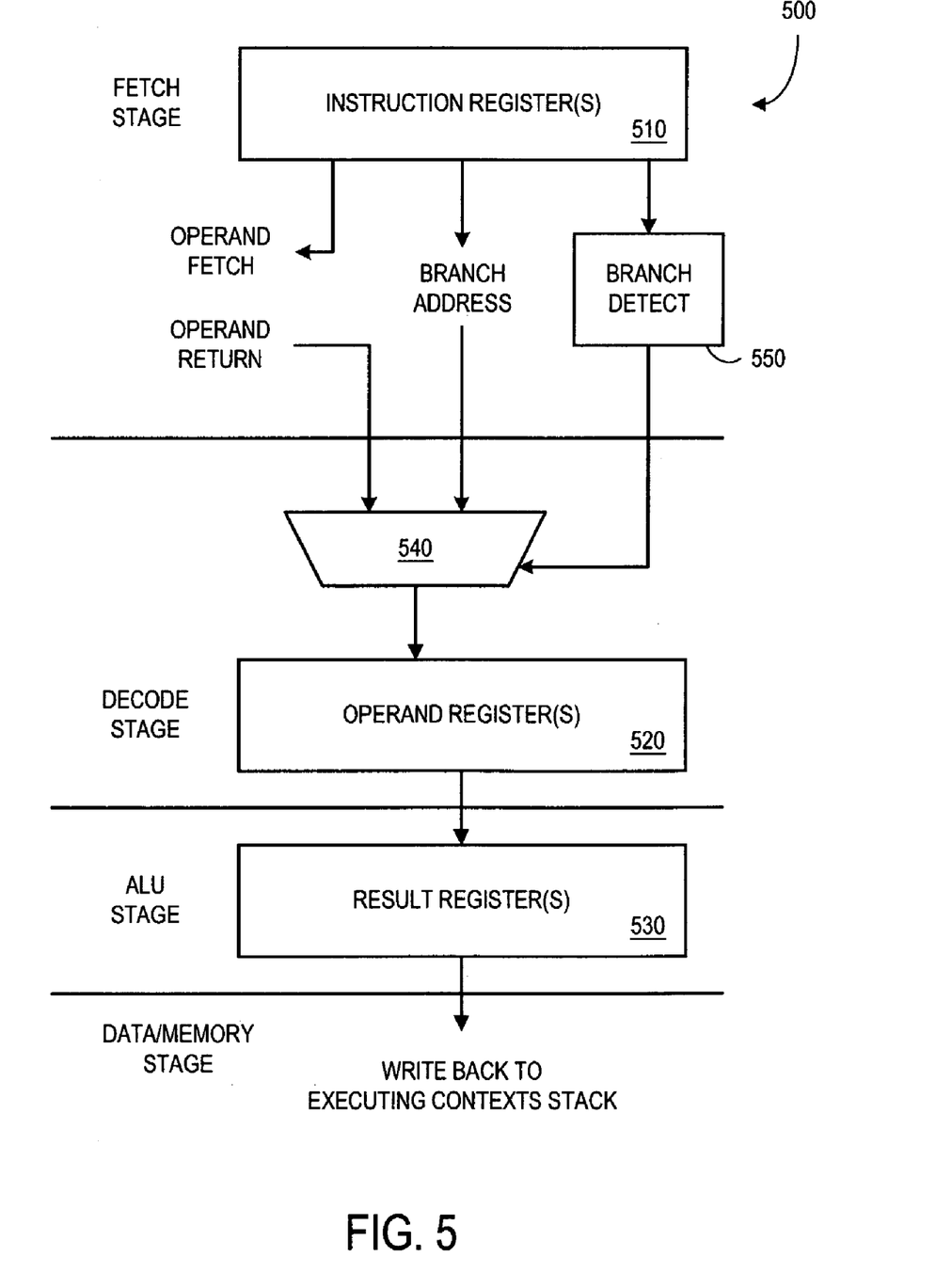
FIG. 5 illustrates registers in a pipeline according to some embodiments.

FIG. 5 illustrates registers in a pipeline 500 according to some embodiments. In particular, information associated with an instruction to be executed is stored in an instruction register 510. When the fetch stage is completed, information may be transferred to an operand register 520 associated with the decode stage. After the decode stage is completed, information is transferred to a result register 530 associated with the ALU stage of the pipeline 500. The instruction may then complete execution in the data/memory stage (e.g., and an executing contexts stack may be updated).

Note that a processor may execute different types of instructions. Some instructions, such as an ALU instruction, may fetch an operand value and return that value to the operand register 520. Other types of instructions, such as a branch instruction, may not require an operand fetch or return. Moreover, some instructions (e.g., a branch instruction) may propagate a branch address value through the pipeline 500 while other instructions (e.g., an ALU instruction) may not.

According to some embodiments, a storage register in the processor pipeline 500 can store either an operand value or a branch address value. For example, a multiplexer 540 may provide either an operand value or a branch address value to the operand register 520 associated with the decode stage. The operand register 520 may then provide information associated with either the operand or the branch address to the result register 530. That is, since only branch-type instructions may need to propagate a branch address (and branch-type instructions may not need to propagate an operand or result), it is possible to use the operand register 520 and the result register 530 to propagate the branch address (and perhaps associated parameters) through the pipeline 500. Because separate operand and branch address registers are not needed, the area overhead associated with the pipeline 500 may be reduced.

If branch detect logic 550 determines that the instruction in the instruction register 510 is a branch-type instruction, it controls the multiplexer 540 to pass the branch address value to the operand register 520. The branch address value may then propagate through the pipeline 500 (e.g., via the result register 530). If the branch detect logic 550 determines that the instruction is not a branch-type instruction, it controls the multiplexer 540 to pass the operand to the operand register 520. The information associated with the operand may then propagate through the pipeline 500 (e.g., via the result register 530).

Figure 6:
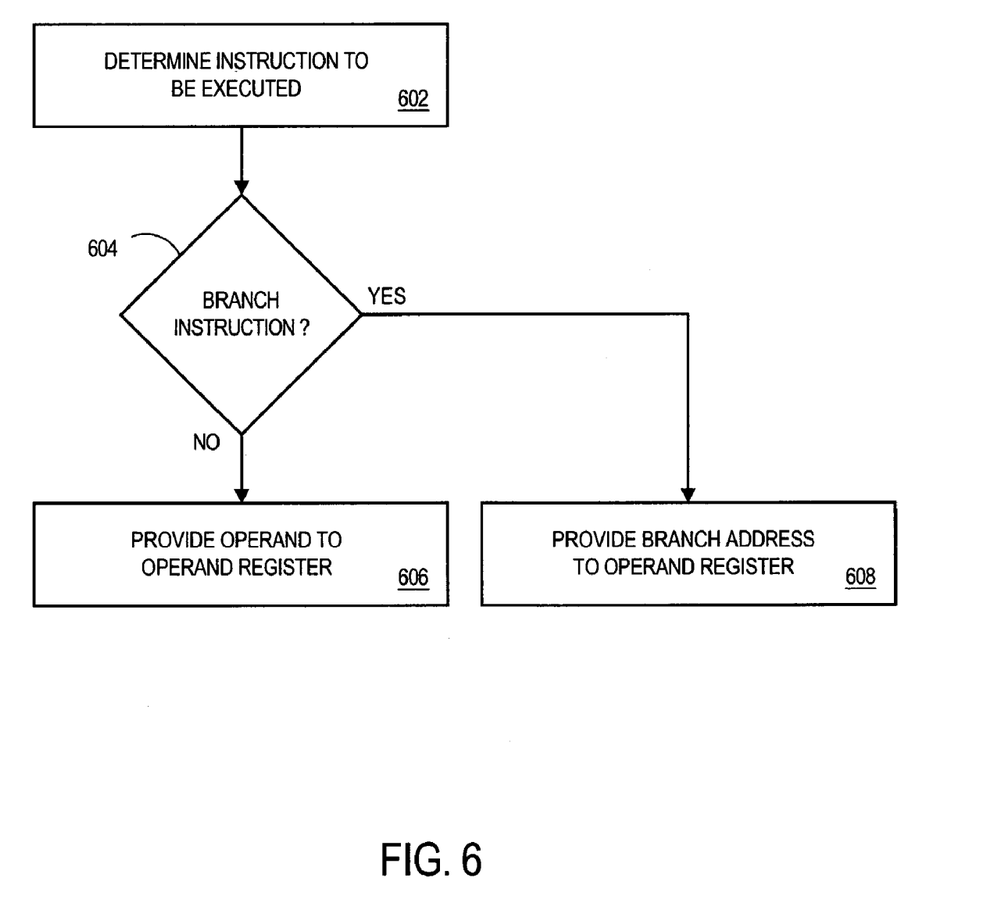
FIG. 6 is a flow chart of a method according to some embodiments.

FIG. 6 is a flow chart of a method according to some embodiments. An instruction to be executed is determined at 602. For example, a program counter value may be used to transfer an instruction from an instruction memory to an instruction register. If the instruction is not a branch instruction at 604, an operand is provided to an operand register at 606. If the instruction is a branch instruction at 604, a branch address is provided to the operand register at 608. Note that a minor penalty in the timing budget caused by such a determination might not change the design's critical path (and therefore performance may not be significantly reduced).

Network Processor

Figure 7:
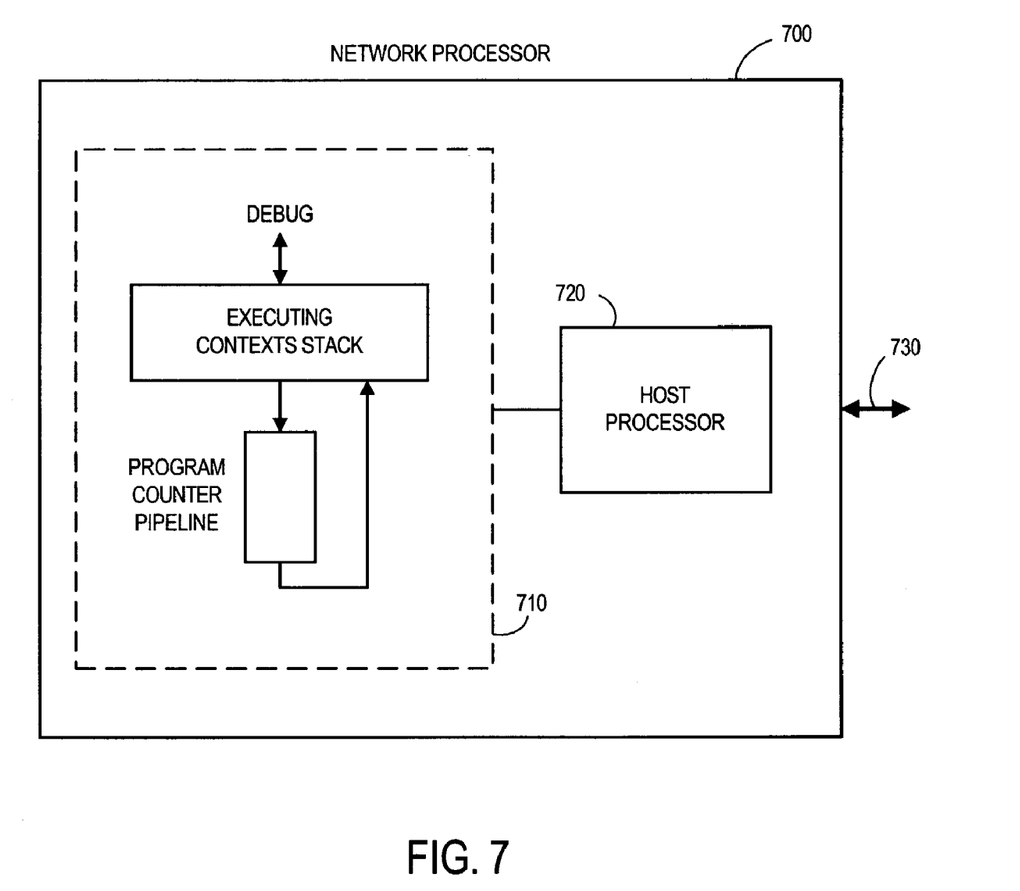
FIG. 7 is a block diagram of a network processor according to some embodiments.

FIG. 7 is a block diagram of a network processor 700 including a supplemental processor 710. According to this embodiment, the supplemental processor 710 is a Reduced Instruction Set Computer microprocessor that performs low-level data PHY processing for Asynchronous Transfer Mode (ATM) information. For example, the supplemental processor 710 may be used to process Universal Test and Operations PHY Interface for ATM (UTOPIA) information in accordance with ATM Forum document AF-PHY-0017.000 entitled "UTOPIA Specification Level 1, Version 2.01" (March 1994). Moreover, the supplemental processor 710 may operate in accordance with any of the embodiments described herein (e.g., using an executing contexts stack accessible via a debugging interface).

The network processor 700 also includes a host processor 720 to facilitate an exchange of information with at least one remote device (e.g., via a UTOPIA interface 730 and/or an ATM switch fabric).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although particular context levels have been described (e.g., a background context level, context level 1, context level 2, and a debugging context level), other embodiments might have more, fewer, or other types of context levels.

In addition, although some embodiments have been described with respect to the ATM protocol, other embodiments may be associated with other protocols, including Internet Protocol (IP) packets exchanged in accordance with a System Packet Interface (SPI) as defined in ATM Forum document AF-PHY-0143.000 entitled "Frame-Based ATM Interface (Level 3)" (March 2000) or in Optical Internetworking Forum document OIF-SPI3-01.0 entitled "System Packet Interface Level 3 (SPI-3): OC-48 System Interface for Physical and Link Layer Devices" (June 2000). Moreover, Synchronous Optical Network (SONET) technology may be used to transport IP packets in accordance with the Packets Overt SONET (POS) communication standard as specified in the Internet Engineering Task Force (IETF) Request For Comment (RFC) 1662 entitled "Point to Point Protocol (PPP) in High-level Data Link Control (HDLC)-like Framing" (July 1994) and RFC 2615 entitled "PPP over SONET/Synchronous Digital Hierarchy (SDH)" (June 1999).

Moreover, embodiments might be associated with a core processor that exchanges information with a number of coprocessors. The core processor might be, for example, a RISC microprocessor associated with low-level data processing in the physical layer of the Open Systems Interconnection (OSI) Reference Model as described in International Organization for Standardization (ISO)/International Electrotechnical Commission (IEC) document 7498-1(1994). The coprocessors might, for example, provide a PHY interface to a data stream or hardware assistance for processing tasks. In addition, the core processor may communicate with the coprocessors via a coprocessor bus. The core processor may use the coprocessor bus, for example: to request data from a coprocessor; to request to set a value in a coprocessor; or to request that a coprocessor perform an operation, such as to increment a value in the coprocessor. The operation of the core processor might be facilitated in accordance with any of the embodiments described herein.

The several embodiments described herein are solely for the purpose of illustration. Persons skilled in the art will recognize from this description other embodiments may be practiced with modifications and alterations limited only by the claims.

What is claimed is:

1. An apparatus, comprising:
   a first portion in a bank of storage registers to store information associated with a first instruction execution context level;
   a second portion in the bank of storage registers to store information associated with a second instruction execution context level, wherein a debugging interface is to write information into at least one of the first and second portions; and
   a pipeline of program counter registers to receive and propagate either of (i) information from the bank of storage registers or (ii) information from the debugging interface.

2. The apparatus of claim 1, wherein the debugging interface is to further read information from at least one of the first and second portions.

3. The apparatus of claim 1, wherein information in the bank of storage registers includes at least one of: (i) a next program counter, (ii) a jump program counter, (iii) an active indication, (iv) a sequential indication, (v) a pre-emption indication, (vi) an arithmetic-logic unit flag value, or (vii) a repeat count value.

4. The apparatus of claim 1, wherein at least one of the context levels is (i) a background level, (ii) a level associated with the debugging interface, or (iii) a priority level.

5. The apparatus of claim 1, wherein the bank of storage registers comprises an executing contexts stack to be updated after an instruction is executed.

6. The apparatus of claim 1, wherein information propagates through the pipeline as an associated instruction is executed, and the pipeline includes at least one of (i) a fetch program counter register, (ii) a decode program counter register, (iii) an arithmetic-logic unit program counter register, or (iv) a data/memory program counter register.

7. The apparatus of claim 1, wherein information is written to the bank of storage registers after the information propagates through the pipeline.

8. The apparatus of claim 1, further comprising:
   a multiplexer to provide a program counter value to the pipeline, wherein the multiplexer is to receive (i) a current program counter value from the bank of storage registers, (ii) a next program counter value from the bank of storage registers, (iii) a program counter value from the debugging interface, and (iv) an incremented program counter value.

9. A method, comprising:
   storing information associated with first instruction execution context level in a first portion in a bank of storage registers,
   storing information associated with second instruction execution context level in a second portion in the bank of storage registers,
   writing information into the bank of storage registers via a debugging interface; and
   providing a program counter value from the bank of storage registers to a program counter pipeline.

10. The method of claim 9, further comprising:
    reading information from the bank of storage registers via the debugging interface.

11. The method of claim 9, further comprising:
    propagating the program counter value through the pipeline.

12. The method of claim 11, further comprising:
    writing information to the bank of storage registers after the program counter value propagates through the pipeline.

13. An apparatus, comprising:
    a storage medium having stored thereon instructions that when executed by a machine result in the following:
    storing information associated with first instruction execution context level in a first portion in a bank of storage registers,
    storing information associated with second instruction execution context level in a second portion in the bank of storage registers,
    writing information into the bank of storage registers via a debugging interface, and
    providing a program counter value from the bank of storage registers to a program counter pipeline.

14. The apparatus of claim 13, wherein the instructions further result in:
    reading information from the bank of storage registers via the debugging interface.

15. An apparatus, comprising:
    a first storage register associated with a first stage of an instruction pipeline;
    a second storage register associated with a second stage of an instruction pipeline; and
    a branch detector to determine if information in the first storage register is associated with a branch instruction, wherein at least a portion the second storage register is to store (i) information associated with an operand value when the branch detector determines that information in the first storage register is not associated with a branch instruction and (ii) information associated with a branch address value when the branch detector determines that information in the first storage register is associated with a branch instruction.

16. The apparatus of claim 15, wherein the first storage register comprises an instruction register and the second storage register comprises an operand register.

17. The apparatus of claim 16, further comprising:
a result register to receive from the operand register information associated with either the operand value or the branch address value.

18. The apparatus of claim 17, wherein information from the result register is to be provided to a bank of storage registers to store context information for each of a plurality of context levels.

19. A system, comprising:
a universal test and operations physical layer interface for asynchronous transfer mode;
a host processor to facilitate an exchange of information with at least one remote device via the physical layer interface; and
a supplemental processor, including:
a first portion in a bank of storage registers to store information associated with a first instruction execution context level,
a second portion in the bank of storage registers to store information associated with a second instruction execution context level, wherein a debugging interface is to write information into at least one of the first and second portions; and
a pipeline of program counter registers to receive and propagate either of (i) information from the bank of storage registers or (ii) information from the debugging interface.

20. The system of claim 19, wherein the debugging interface is to further read information from at least one of the first and second portions.

* * * * *